Sept. 27, 1938.  L. W. WATERS  2,131,341
WINDSHIELD WIPER
Filed Jan. 2, 1937
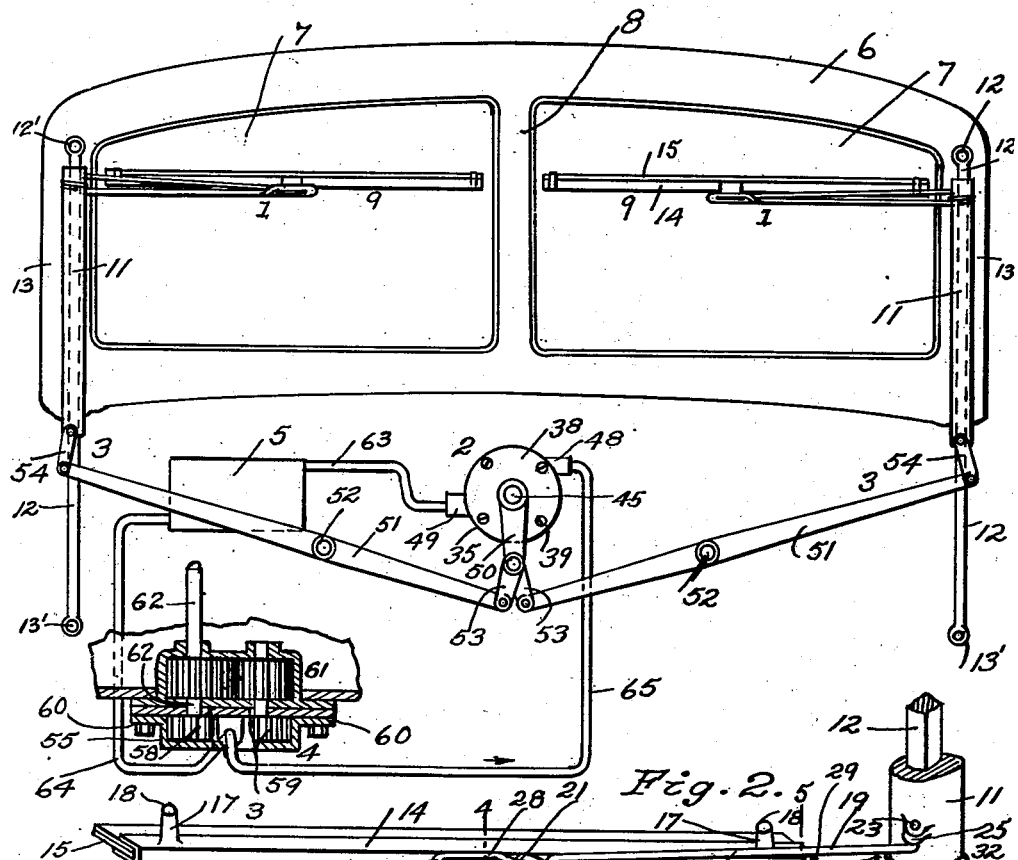
INVENTOR:
LAWRENCE W. WATERS
BY Alan Franklin
ATTORNEY.

Patented Sept. 27, 1938

2,131,341

UNITED STATES PATENT OFFICE 2,131,341

WINDSHIELD WIPER

Lawrence W. Waters, Los Angeles, Calif.

Application January 2, 1937, Serial No. 118,869

2 Claims. (Cl. 15—253)

This invention relates to windshield wipers for motor vehicles, and the general object of the invention is to provide an improved wiper which will be operated positively and at a uniform speed, determined by the speed of the engine, regardless of the grade of the road which the motor vehicle travels.

A more particular object is to provide a windshield wiper for motor vehicles operated hydraulically by a fluid pump driven by the motor of the vehicle, but with fluid other than the oil of the forced lubricating system of the vehicle.

Another object is to provide a windshield wiper which wipes the windshield only in one direction of its movement, and is held out of contact with the windshield in the other direction of its movement, so that it will not smear the windshield during its movement in said other direction, with water remaining on it at the end of its movement in said first direction.

A further object is to provide a windshield wiper which reciprocates vertically over the windshield and wipes the windshield only on its down-stroke, being held out of contact with the windshield on its up-stroke, so as not to smear the windshield with water left on it at the end of its down-stroke, and so that water will not run over it from the windshield and back onto the windshield on its up-stroke.

Other objects and advantages will appear hereinafter.

The invention is illustrated in the annexed drawing which forms a part of this specification and in which:

Fig. 1 is a view, partly in front elevation and partly schematic, of my invention, shown applied to the windshield and lubrication pump of a motor vehicle.

Fig. 2 is a perspective of one of the wiper members of my invention.

Fig. 3 is an end view of one of the wiper members and cross section of a windshield, with the wiper member shown held out of contact with the windshield in the position it assumes on its up-stroke.

Fig. 4 is a cross section of the wiper member taken on line 4—4 of Fig. 2, with the wiper member shown in contact with a windshield in the position it assumes on the down-stroke of the wiper.

Fig. 5 is a view like Fig. 4 taken on line 5—5 of Fig. 2.

Fig. 6 is a vertical cross section of the hydraulic wiper motor, taken on line 6—6 of Fig. 7.

Fig. 7 is a vertical longitudinal section of said wiper motor taken on line 7—7 of Fig. 6.

Fig. 8 is a front elevation of the hydraulic pump of my invention.

Referring to the annexed drawing, in which corresponding parts are designated by the same reference characters in all of the figures, my invention includes generally a pair of wiper members 1, a wiper motor 2, wiper atcuating means 3 for each wiper member 1, operated by said motor, a wiper fluid pump 4 for operating said motor, and a fluid tank 5 for containing the fluid pumped by said pump through said motor for operating the same.

As illustrated in Fig. 1 of the drawing, my wiper may be applied to a motor vehicle windshield 6 formed with a pair of glass panels 7, separated by a vertical frame member 8 centrally of the vehicle with the wiper members 1 positioned respectively in front of said panels, to wipe the same respectively.

Each of the wiper members 1 comprises a wiper bar 9, a wiper arm 10, on which said bar is mounted, and a sleeve 11, on which said arm is mounted, which sleeve is slidably fitted on a vertical square rod 12 secured at its upper end at 12' to a side frame member 13 of the windshield 6, and at its lower end at 13' to a suitable part of the motor vehicle. Each wiper bar 9 comprises a channel bar 14 and a flexible strip 15 of rubber or other suitable material, the outer edge of which strip is clamped in said channel bar, and said channel bar is formed with a flange 16 outstanding from its outer edge, and a pair of lugs 17 upstanding from the upper side of said channel bar at the ends thereof respectively; on the ends of lugs are secured rubber caps 18. Each wiper arm 10 may be formed of a single piece of wire 19, bent upon itself at 20, twisted near its bend 20 at 21 and its ends 22 and 23 bend downwardly and upwardly respectively at right angles to said wire, which bent ends are turnably fitted in a pair of lugs 24 and 25 respectively formed on a sleeve 11. The twist 21 in the wire 19 forms a longitudinal slot 26 between the bent members 27 and 28 of the wire, between said twist and the outer end, at 20, of the wiper arm 10, through which slot the flange 16, on the channel bar 14, is inserted, whereby the wiper bar 9 is mounted on the outer end of the arm 10. A cross member 29 extends between and is secured to the arm members 27 and 28 near their pivoted ends 22 and 23, and said cross member is formed with a stud 30 which fits loosely in an opening 30' in the wiper channel bar 14 and holds the adjacent end of the wiper bar steady, but allows said bar to swing up or down from the arm 10 at the connection of the bar and arm by the bar flange 16 and arms slot 26. A cross wire 31 extends between and is secured to the arm members 27 and 28 close to the pivoted ends 22 and 23 of the arm 10, and a spring 32 is coiled around the sleeve 11, with one end 33 secured to said sleeve and its other end 34 secured to said cross wire 31, whereby the arm 10 and wiper bar 9 are swung inwardly to hold the rear edge of the wiper strip 15 against a glass panel 7 of the windshield 6.

The wiper motor 2 comprises a stator 35 and a rotor 36 journaled within said stator. The stator 35 is in the form of a casing 37 with one end wall 38 detachably secured to one end of said casing by screws 39. Bearings 40 and 41 are formed respectively in the fixed end wall 42 and the detachable end wall 38 of the stator 35. The stator casing is formed with an internal spiral wall 37 about the axis of the bearings 40 and 41. The rotor 36 comprises a hub 43, formed with trunnions 44 and 45 journaled in bearings 40 and 41 respectively, and a plurality of radial blades 46 slidably mounted in radial slots 47 in said hub, the outer ends of which blades wipe the spiral internal wall 39 of the stator 35. The stator 35 is provided with an inlet 48 and an outlet 49, said inlet leading into the stator between the low point and the high point of the spiral wall 37, and said outlet leading from the stator at a point slightly greater than 90° from said inlet.

The wiper actuating means 3 comprises a crank 50 secured on the outer end of the rotor trunnion 45, a pair of levers 51 pivoted at 52 at suitable points on the motor vehicle, a pair of links 53 pivoted at one end to said crank 50 and at their other ends to one end of said levers 51 respectively, and a pair of links 54 pivoted at one end to the other ends of said levers 51, respectively, and at their other ends to the lower ends of the wiper sleeves 11 respectively.

The wiper fluid pump 4 comprises a casing 55, provided with an inlet 56 and an outlet 57, and a pair of intermeshing gears 58 and 59, journaled in said casing, said inlet and said outlet being located in the upper and lower walls respectively of said casing opposite the intermeshing teeth of said gears. The casing 55 is formed at its inner edge with an external flange 60 which is bolted to the outer side of the casing of the lubrication pump 61 of the motor vehicle. The drive shaft 62 of said lubrication pump is extended through the casing of said pump and through the casing 55 of the fluid pump 4 and into said fluid pump, and the gear 58 of said fluid pump is secured on said drive shaft, whereby the fluid pump 4 is operated by said drive shaft. From the outlet 49, of the wiper motor 2, a pipe 63 leads into the fluid tank 5. From said tank a pipe 64 leads into the inlet 56 of the fluid pump 4. From the outlet 57 of the wiper fluid pump 4 a pipe 65 leads into the inlet 48 of the wiper motor 2.

The operation of my invention is as follows:

The wiper fluid pump 4 being driven by the drive shaft 62 of the lubrication pump 61 of the motor vehicle, fluid is pumped by the wiper fluid pump 4, from the tank 5, into said fluid pump and from said pump fluid is pumped through pipe 65 and motor inlet 48 into the wiper fluid motor 2, and acting upon the rotor blades 46 rotates the rotor 36 and is forced by the rotor blades out of the motor through its outlet 49 and through pipe 63 back into the tank 5, completing the pumping cycle which is repeated. Rotation of the rotor 36 rotates its trunnion 45 and the crank 38, whereupon the levers 51, through links 53, are oscillated, and the wiper members 1, through links 54 connected to the wiper sleeves 11, are reciprocated up and down over the windshield 6. On the down stroke of the wiper members 1 the wiper strips 15 contact with the windshield panels 7, which causes the wiper bars 9 to swing up at an angle from the wiper arms 10, as shown in Figs. 4 and 5 of the drawing, and in said angular position of the wiper bars the wiper strips 15 wipe said panels (see Figs. 4 and 5). On the up-stroke of the wiper members 1, the wiper strips 15 at the beginning of said stroke, being in contact with the windshield panels 7, cause the wiper bars 9 to swing down at an angle from the wiper arms 10, until the rubber caps 18, of the lugs 17 on said wiper bars, engage the surface of the windshield panels 7 and hold the wiper strips 15 out of contact with the surface of said panels, and in this position the wiper bars move upwardly to the end of their up-strokes so that no water will flow from the windshield over said wiper bars, or be smeared by said bars on the windshield on said up-stroke of said wiper members. (See Fig. 3.)

Normally the springs 32 swing the wiper arms 10 and bars 9 rearwardly until the rear edges of the wiper strips 15 or the lug caps 18 engage the surfaces of the windshield panels 7, but the wiper bars and arms may be grasped and swung forwardly away from said panels against the tension of said springs when desirable.

The wiper bars 9 may be readily removed from the arms 10 by withdrawing the flanges 16 from the arm slots 26 and the studs 30 from the openings 30' in the channel bars 14.

When not in operation my wiper members 1 are brought to rest in their uppermost position with the rubber caps 18 of the lugs 17 engaging the glass panels 7 of the windshield 6 and the rubber wiper strips 15 out of contact with said glass panels as shown in Fig. 3 of the drawing, thus preventing said rubber wiper strips from breaking down under continued contact under tension with the windshield panels.

An important advantage of my invention is that my hydraulic motor is operated by clean fluid and not by the lubricating oil of the forced-feed lubricating system of the motor vehicle, so that no carbon from the engine can get into the fluid utilized in my pump to operate my motor.

I claim:

1. In a windshield wiper, a wiper member including a wiper bar, a wiper arm, means whereby said wiper arm is slidably and operatively mounted, a flange on said wiper bar, said wiper arm being provided with a slot to receive said flange for mounting said bar on said arm to swing up or down laterally from said arm, means on said arm for engaging one end of said bar to hold said bar steady while permitting said bar to swing laterally on said arm, studs on said bar for engaging a windshield and holding said bar out of contact with said windshield when said bar is swung down from said arm on the up-stroke of said wiper member, and means for urging said wiper bar toward said windshield.

2. In combination with a motor vehicle, a pair of wiper members for wiping the windshield of the motor vehicle at opposite sides respectively of the center of said windshield, vertical rods mounted at opposite sides respectively of said windshield, said wiper members respectively including sleeves slidably mounted on said rods respectively for vertical reciprocation of said wiper members, a rotary motor mounted on said motor vehicle, means whereby said motor is driven, a crank on the shaft of said motor, a pair of levers mounted on the motor vehicle, links connecting one end of said levers respectively and said crank, and links connecting the other ends respectively of said levers and said wiper sleeves respectively.

LAWRENCE W. WATERS.